(12) United States Patent
Gfeller et al.

(10) Patent No.: US 6,850,709 B1
(45) Date of Patent: Feb. 1, 2005

(54) APPARATUS AND METHOD FOR IMPROVED CONNECTIVITY IN WIRELESS OPTICAL COMMUNICATION SYSTEMS

(75) Inventors: Fritz Gfeller, Bonstetten (CH); Hirt Walter, Wettswil (CH); Brian R. Ingham, Aurora (CA)

(73) Assignee: Internatioal Business Machines Corporation, Armonk, NY (US)

( * ) Notice: Subject to any disclaimer, the term of this patent is extended or adjusted under 35 U.S.C. 154(b) by 0 days.

(21) Appl. No.: 09/623,961

(22) PCT Filed: Apr. 21, 1999

(86) PCT No.: PCT/IB99/00706
§ 371 (c)(1),
(2), (4) Date: Dec. 18, 2000

(87) PCT Pub. No.: WO00/42719
PCT Pub. Date: Jul. 20, 2000

(51) Int. Cl.$^7$ ............................................... H04B 10/00
(52) U.S. Cl. ...................... 398/118; 398/135; 398/119; 398/127; 398/136; 398/202; 398/208; 398/138; 398/25; 398/26; 375/355; 375/365
(58) Field of Search ................................ 398/135, 118, 398/119, 127, 131, 136, 138, 202, 208, 25, 26; 375/355, 365

(56) References Cited

U.S. PATENT DOCUMENTS

| | | | |
|---|---|---|---|
| 5,566,022 A | | 10/1996 | Segev |
| 5,790,295 A | * | 8/1998 | Devon ........................ 398/202 |
| 5,808,760 A | * | 9/1998 | Gfeller ........................ 359/110 |
| 6,188,496 B1 | * | 2/2001 | Krishna et al. ............. 398/177 |
| 6,298,047 B1 | * | 10/2001 | Steffes et al. ............... 370/310 |
| 6,377,376 B1 | * | 4/2002 | Gfeller et al. .............. 359/152 |
| 6,388,784 B1 | * | 5/2002 | Nakamura et al. .......... 359/154 |
| 6,424,442 B1 | * | 7/2002 | Gfeller et al. .............. 359/152 |

FOREIGN PATENT DOCUMENTS

| | | |
|---|---|---|
| JP | 03-135233 | 6/1991 |
| JP | 04-243331 | 8/1992 |
| JP | 05-022231 | 1/1993 |
| JP | 10-126343 | 5/1998 |
| JP | 10-229368 | 8/1998 |
| JP | 10-233739 | 9/1998 |

OTHER PUBLICATIONS

"Request for Comments on Advanced Infrared Physical Layer Specifications", Standards contribution to Infrared Data Association, Toronto, Canada, Apr. 15–17, 1997, Version 0.1.

Pakravan et al., "Direction Diversity for Indoor Infrared Wireless Communication Receivers", IEEE Int'l Conf. on Communication, Seattle, Jun. 18–22, 1995.

Pakravan et al., "Design Considerations for Broadband Indoor Infrared Wireless Communication Systems", Int'l Journal of Wireless Information Networks, vol. 2, No. 4, 1995.

Tang et al., "Wireless Infrared Communication Links using Multi–Beam Transmitters and Imaging Receivers", IEEE Int'l Conf. on Communication, Dallas, Jun. 23–27, 1996.

(List continued on next page.)

Primary Examiner—Hanh Phan
(74) Attorney, Agent, or Firm—Ference & Associates

(57) ABSTRACT

The present invention provides an apparatus and a method for improved connectivity in wireless optical networks. Therefore at least two or more receiving units are used which receive an infrared signal and convert it to a digital signal. The digital signals represent data in the form of frames whereby each frame comprises at least a data field and a header field containing a preamble. A selector determines a measure related to the signal-to-noise ratio of the preamble and compares the measures in order to select the best suited signal for further processing.

22 Claims, 5 Drawing Sheets

OTHER PUBLICATIONS

Carruthers et al, "Angle Diversity for Nondirected Wireless Infrared Communication", IEEE Transactions on Communications, University of California, Berkeley.

Valadas et al., "Angle Diversity to Combat the Ambient Noise in Indoor Optical Wireless Communication Systems", Int'l Journal of Wireless Information Networks, vol. 4, No. 4, 1997.

Sung et al., "Signal Processing of High Speed Nondirective Infrared Wireless Communications", Journal of the Chinese Institute of Electrical Engineering, vol. 2, No. 4, 1995.

U.S. Appl. No. 048749, filed Mar. 12, 1998, "Optoelectronic Transceiver".

Yukawa Akira, Exaggerated sampling A–D conversion technology, Nikkei Business Publications, Inc., p. 7, Japan.

* cited by examiner-

APPARATUS AND METHOD FOR IMPROVED CONNECTIVITY IN WIRELESS OPTICAL COMMUNICATION SYSTEMS

TECHNICAL FIELD

The present invention is related to an apparatus and a method for receiving an infrared signal. More particularly, the invention relates to a scheme for selection of the most suitable signal.

BACKGROUND OF THE INVENTION

Many devices and most mobile computers today are equipped with wireless infrared facilities for communication links. Traditionally, infrared links have been classified according to whether they employ a directional or non-directional receiver and transmitter, and whether or not they rely upon the existence of an uninterrupted line-of-sight path between the receiver and the transmitter. At present, directed, line-of-sight links, hereinafter abbreviated to LOS, are the most widely used. Because they employ directional receivers and transmitters, the path loss is minimized, and multipath distortion is usually negligible. Another link design is the non-directed, non-LOS link, also referred to as a diffuse link, which relies upon diffuse reflection of light from an extended surface, such as a ceiling and walls.

A unit which is able to transmit and receive infrared signals is called a transceiver. Practical wireless infrared transceivers are restricted to use one optical receiver, which might be a photodiode (PD) and one optical emitter, which might be a light emitting diode (LED). The current types of transceivers based on LOS propagation are best suited for point-to-point communication and are not suited for integration in a mobile- or fixed platform meant to operate in a wireless infrared networking environment. These transceivers commonly contain only one optical receiving element that has a fundamentally different reception characteristic compared to the optical transmitter's characteristic. Such transceivers violate the optical parity rule. Because, the receiver exhibits a reception angle $\phi_R$ of about ±60°, also referred to as wide-angle, and the transmitter comprises an emission angle $\phi_E$ of about ±15°, also referred to as narrow-angle. This leads to both insufficient connectivity coverage and link performance degradation in a typical networking application. Insufficient connectivity coverage means that i) network participants cannot connect to certain other participants, ii) certain links are unreliable, or iii) some links offer not enough bandwidth for the application, which means that the required data rate can not be achieved. Further, the data throughput is low because of the low data rate and/or high error rate which means that performance degradation occurs because of reduced link quality combined with improper operation of a collision avoidance mechanism.

The optical parity concept was disclosed in the contribution "Request for Comments on Advanced Infrared (AIr) IrPHY Physical Layer Specifications", Standards contribution to Infrared Data Association (IrDA), Toronto, Canada, Apr. 15–17, 1997, Version 0.1 (Hewlett-Packard Company and IBM Corporation).

An U.S. patent application with the Ser. No. 048 749 US, filed on 26 Mar. 1998 and entitled "Optoelectronic Transceiver", discloses a concept of optical transceiver parity. This US patent application is presently assigned to the assignee of the instant application.

U.S. Pat. No. 5,566,022 is related to an infrared communication system. The system includes a plurality of infrared transceivers for receiving and transmitting infrared signals through the free air. A circuit determines the direction of arrival of the received signal and provides this information to a dedicated logic controller (DLC), for registration purposes and for controlling the respective infrared transmitter.

One of the important features of infrared communications is its sensitivity to the direction of reception. The publication "Direction Diversity for Indoor Infrared Wireless Communication Receivers" by M. R. Pakravan and M. Kavehrad of the IEEE International Conference on Communication, Jun. 18–22, 1995, Seattle, discusses the effects of rotation on the characteristics of the received signal from a simulation point of view.

The article "Design Considerations for Broadband Indoor Infrared Wireless Communication Systems" by M. R. Pakravan and M. Kavehard in International Journal of Wireless Information Networks, Vol. 2, No. 4, 1995, is similar to the publication mentioned above and discusses the effects of receiver direction and field-of-view on the channel parameters.

In the paper "Wireless Infrared Communication Links using Multi-Beam Transmitters and Imaging Receivers" by A. P. Tang, J. M. Kahn, Keang-Po Ho, of the IEEE International Conference on Communication, Jun. 23–27, 1996, Dallas, the use of imaging receivers in infrared links is analyzed.

The research report "Angle Diversity for Nondirected Wireless Infrared Communication" by J. B. Carruthers and J. M. Kahn, University of California, Berkeley, submitted to IEEE Transactions on Communications, discusses practical considerations for multi-element angle-diversity systems. Unfortunately, the report does not offer a practical solution to the present problem because it is based on highly complex and costly optical receiver arrays combined with analog high-order signal selection/concentration schemes.

The article "Angle Diversity to Combat the Ambient Noise in Indoor optical Wireless Communication Systems" by R. T. Valadas, A. R. Tavares, A. M. de Oliveira Duarte, in International Journal of Wireless Information Networks, Vol. 4, No. 4, 1997, describes theoretical approaches to estimate several signal-to-noise ratios based on the analog current of several photodiodes.

In the article "Signal Processing of High Speed Nondirective Infrared Wireless Communications" by Po-An Sung, Ya-Ku Sun, Kwang-Cheng Chen, in Journal of the Chinese Institute of Electrical Engineering, Vol. 2, No. 4, 1995, theoretical and numerical results of different diversity techniques are demonstrated.

All mentioned documents describe several theoretical approaches and simulations but these give no practical solution for known technical problems.

Further, network connectivity coverage between mobile platforms, e.g. laptop computers, and fixed access points, e.g. repeater stations or printers, that are all equipped with conventional wireless infrared transceivers is expected to be insufficient for typical user scenarios. Usually, one single transceiver is used in mobile or certain fixed platforms which leads to the above mentioned problems and disadvantages in wireless optical networking application. Some platforms, e.g. laptop computers, are equipped with two transceivers and the user has to decide by manual interventions which one of the two transceivers is to be used. Thus, current infrared transceivers are limited for the use of future wireless infrared applications based on multi-point connectivity.

OBJECT OF THE INVENTION

It is an object of the present invention to provide a method and apparatus for receiving an infrared signal and for selecting the best suited signal from several received infrared signals.

It is another object of the invention to overcome the disadvantages of the prior art.

It is still another object of the present invention to achieve an improved connectivity in wireless optical networks.

It is yet another object of the present invention to provide a simple and fast optical receiver for reliable reception of an infrared signal.

It is a further object of the present invention to present an apparatus for receiving or for receiving and transmitting an infrared signal which provides a sufficient or even better connectivity coverage than so-far known arrangements do, i.e. each network participant connects with all others with sufficient bandwidth.

It is still a further object of the present invention to provide a method for receiving or for receiving and transmitting an infrared signal in order to achieve reliable communication links.

SUMMARY AND ADVANTAGES OF THE INVENTION

The present invention provides an apparatus and a method for improved connectivity in wireless optical networks and is particularly suited for multi-point connectivity. The idea is to use at least two or more receiving units which receive an infrared signal and convert it to a digital signal. The digital signals represent data in the form of frames whereby each frame comprises at least a data field and a header field containing a preamble. The preamble is identical for each received signal since it can be assumed that each received signal comes from the same source, i.e. from the same transmitter. A selector determines a measure related to the signal-to-noise ratio of the preamble and compares the measures in order to select the best suited signal for further processing. Thus, the selector indirectly estimates a corresponding measure of the signal-to-noise ratio of the preamble or from at least a part of the preamble. Thereby it does not matter from which direction exactly a signal comes from, rather the best suited signal is required. The best or the best suited signal, is to be considered as the signal with the lowest error rate or with the highest signal-to-noise ratio, which indicates that the signal is least influenced by noise or other distortions. It should be noted, that the best signal is not necessarily the strongest signal. It should be noted further, that not the full or entire preamble has to be used or investigated to determine the best suited signal. This depends on the quality of the received signal and the efficiency of recognition or analysis schemes implemented in the hardware.

The present invention provides improved connectivity in wireless optical networks and is particularly suited for multi-point connectivity between mobile platforms or portable devices, e.g. laptop computers, hand-held devices, and fixed access points, e.g. repeater stations, printers, or peripheral equipment. A typical user scenario can be a round-table configuration comprising a plurality of stations in a conference room.

The present invention has the advantage that it requires only simple optical receivers in combination with processing of binary signals obtained from at least two or more receiving units. A simple converter converts a received infrared signal to a digital signal, whereby the digital signals represent data carried in frames comprising at least a data field and a header field which contains preamble being identical for each of the digital signals. It is another advantage of the present invention that from several received infrared signals the best suited one can be selected fast by a selector and used for further processing since the preamble is identical for each signal. It is a further advantage that communicating devices equipped with an apparatus according to the present invention or a receiving unit and a transmitting unit will not need an alignment as accurate as before and are well suited for multi-point networking applications.

When a preamble of a frame comprises symbols forming a known periodic sequence of pulses, preferably a sequence of pulses with defined period, then the advantage occurs that predefined symbol sequences can be expected by a digital reception-unit or a digital processing-unit and that this unit is able to perform efficient carrier sensing, symbol clock synchronization, and chip clock phase acquisition by a phase-locked loop, also referred to as PLL.

If the received infrared signal in each receiving unit is converted by a binary decision-unit to a digital signal, then the advantage occurs that the further signal processing can be performed by digital processing. The received infrared signal can be converted by a simple binary decision device, which can be easily implemented. A huge advantage, in comparison to a weak analog signal that cannot be forwarded over long distances, is that the converted digital signal can be sent over long wires to a selector or other processing unit without additional noise penalty. Further, only one selector is necessary which can be arranged in a suitable or central place. Analog signals transmitted over wires are susceptible to interference and suffer from noise pick-up. Especially in computer or laptop environments where CD-ROM drives and other equipment create background noise, noise pulses or parasitic frequencies, digital processing achieves higher robustness and reliability in practice.

When the digital signal of the preamble is oversampled and weighted, then the advantage occurs that an efficient method can be applied to estimate the signal-to-noise ratio, hereinafter abbreviated to SNR, that exists on each of the two or more receiving paths or channels. There is no need to actually measure the SNR, only the relative quality of the different receiving paths is required to select the best received digital signal.

If the selection of the one or best suited digital signal occurs during the reception of the preamble at the selector, then the advantage occurs that a fast selection of the one receiver for further receiving can be performed. The best suited signal can be received by one receiver, whereby the other receivers may be switched off to conserve energy.

When each receiving unit is designed to provide an optical reception characteristic which is described by an obtuse reception angle $\phi_R$, wherein the reception angle $\phi_R$ is a planar angle that defines where the receiver's sensitivity is half the sensitivity of the sensitivity on the receiver's optical axis, then the advantage occurs that a large total-reception angle can be provided. This reception angle may cover a range of about 120°.

If the data are encoded by a pulse modulation, preferably a Pulse Position Modulation (PPM), then the advantage occurs that the data can be transmitted in the baseband and therefore no complex modulation techniques are necessary.

When at least the receiving unit which receives the preamble with a lower signal-to-noise ratio than the one receiving unit which receives the one preamble with the highest signal-to-noise ratio is switched off, then the advantage occurs that the electrical power of the entire circuits and the device can be decreased, which is particularly advantageous for mobile devices.

If the transmitting unit has an optical reception characteristic whose shape is identical to the shape of an optical reception characteristic of the receiving unit, for example, in the form of a Lambertian characteristic of $\phi_E \approx \phi_R$, whereby the emission angle $\phi_E$ is a planar angle that defines where the power emitted by the transmitter is half the power of the power on the transmitter's optical axis, then the advantage occurs that the optical parity rule with the desired Lambertian characteristic can be satisfied which leads to an improved connectivity coverage. Furthermore, the use of equal Lambertian reception/emission characteristics in both planes introduce a diffuse-mode component that helps to extend connectivity coverage.

When at least one transmitting unit and at least one receiving unit and the converter are part of a transceiver or if at least one receiving unit and the converter are part of an optical device, then the advantage occurs that all optical components and the converter can be integrated to a single transceiver package or optical device package, which may save space through integration and energy consumption through combination and reduce costs for manufacturing and replacements.

If at least three transceivers or several transceivers are arranged to complement their optical reception characteristics and/or optical emission characteristics, then the advantage occurs that full coverage for connectivity over a range of 360° can be achieved.

When a selector is connected to a unit comprising at least a first modem unit and/or a second modem unit, then the advantage occurs that the selector can operate with units providing several rates and/or speeds, e.g. for variable rate, fixed rate, high speed, low speed.

If the selector is combinable with at least one modem unit, preferably with the first modem unit, then the advantage occurs that the selector and the modem unit can be implemented in a single unit or chip. This unit or chip can be implemented easily in current systems to improve their connectivity according to the present invention.

When at least the selector, the first modem unit, and the second modem unit are combinable to a single unit, then the advantage occurs that space through integration can be saved and that the functions of the units and the selector are implemented in a single unit or chip.

Given that the objective of improved connectivity should be met with current or, preferably, simply improved transceivers, the need arises to equip a platform, i.e. laptop computers, LAN access points, repeater stations, printers, hand-held devices, or other devices, with more than one wireless infrared transceiver. This calls for an apparatus and/or a method for the interconnection and control of several transceivers to achieve a required angle diversity by appropriately combining or selecting the respective signals of the different transceivers.

DESCRIPTION OF THE DRAWINGS

The invention is described in detail below with reference to the following schematic drawings.

Figure 1A:
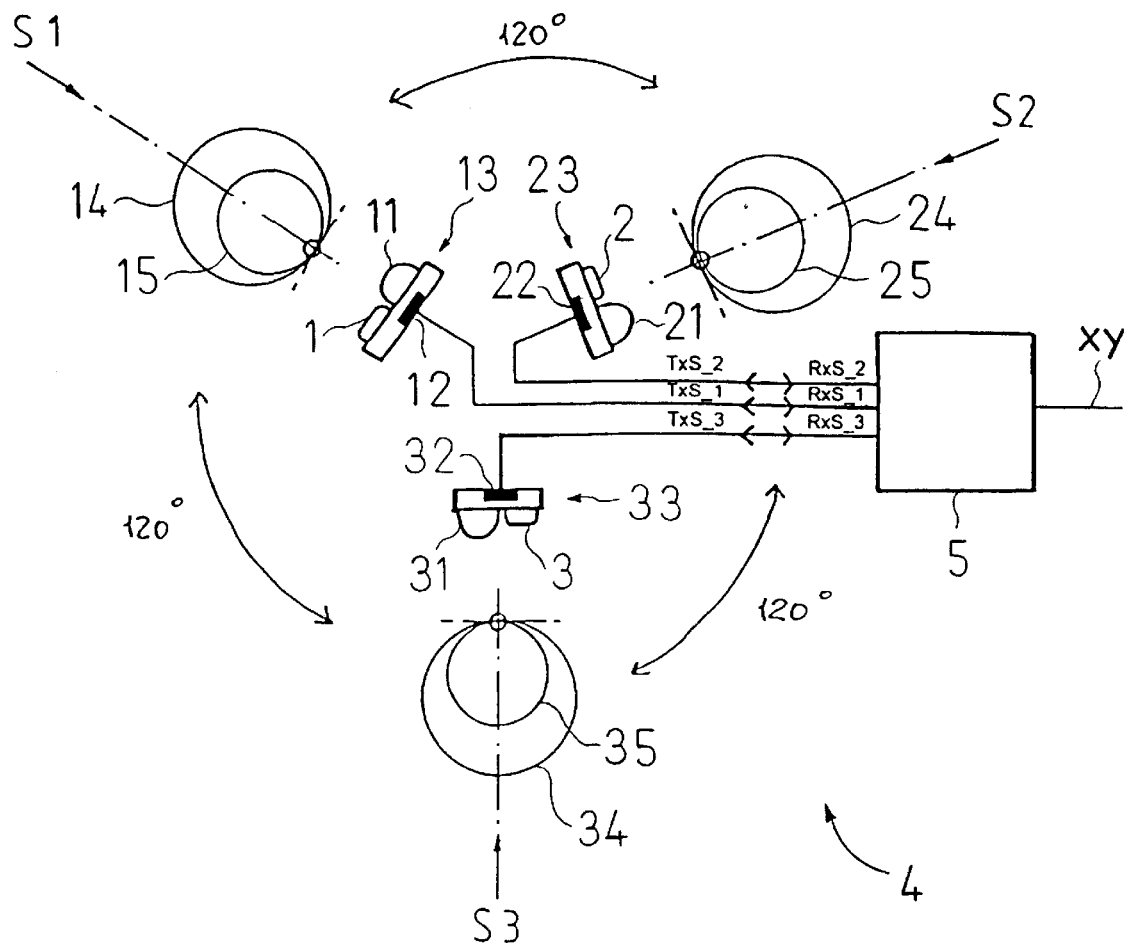
FIG. 1 shows a schematic illustration of an arrangement according to the present invention with three transceivers, the accompanying signals, and a selector.
Figure 1B:
Figure 1C:
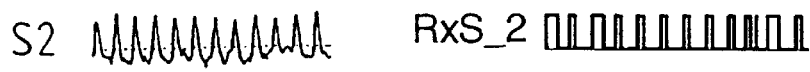
Figure 1D:

All the figures are for the sake of clarity not shown in real dimensions, nor are the relations between the dimensions shown in a realistic scale.

DETAILED DESCRIPTION OF THE INVENTION

Before embodiments of the present invention are described, some basics, in accordance with the present invention, are addressed.

PPM-Pulse Position Modulation:

A Pulse Position Modulation scheme, hereinafter abbreviated to PPM, is used in accordance with the present invention. It should be noted, that other modulations schemes can be used instead, especially advantageous are pulse modulations, e.g. Run-Length Limited Codes, also abbreviated to RLL. The PPM provides a variable data rate with repetition coding. L-slot Pulse Position Modulation is achieved by defining a data symbol of duration $t_D$ and subsequently subdividing the symbol into a set of L, e.g. L=2, 4, 8, 16, equal time slots, also called 'chips'. In L-PPM schemes, only one time slot, or chip, per symbol contains a pulse, which means a logical 'one' or '1'. The other chips contain no pulse, which means a logical 'zero' or '0'. If the base is defined as L=4, then the resulting modulation scheme is called four Pulse Position Modulation or 4-PPM. Because there are four unique positions within each 4-PPM symbol, four independent symbols exist in which only one chip is logically '1' while all other chips are logically '0', whereby there are the following combinations: 1000, 0100, 0010, 0001. These four symbols are the only legal data symbols allowed in 4-PPM. Each data symbol represents two bits of a single data bit pair, which are respectively 00, 01, 10, 11. Logical '1' represents a chip duration when a transmitter is emitting light, while logical '0' represents a chip duration with no light emission.

The Preamble:

A digital signal according to the present invention represents data carried in frames, whereby each frame comprises at least a data field and a header field which contains a preamble. The preamble comprises a periodic symbol sequence to allow for initial carrier sensing, symbol clock synchronization, and chip clock phase acquisition by a phase-locked loop, also referred to as PLL. This means in particular that the preamble is employed to obtain initial relative synchronization of a digital reception- and processing-unit, which is achieved by the transmission of a periodic sequence of pulses. A receiving station which knows how many slots each symbol comprises, is able to detect after a certain while the period of the sequence of pulses. Furthermore, the receiving station adjusts its slot or chip clock phase using a PLL. The preamble comprises a plurality of repeated transmissions, preferably 128 or more, of the following legal 4-PPM symbol P: P=1000. Every other combination is possible if it is use- or helpful, e.g. for additional information transmission. After the preamble may follow a synchronization field, a control field, the data field or other fields.

The Optical Parity:

Unlike radio systems, infrared systems use two physically different elements for reception and transmission which can be a photodiode (PD) and a light emitting diode (LED). Since the reception characteristic of a receiver is different from the emission characteristic of a corresponding transmitter, shortcomings occur not only with data rates. The establishment of transmission symmetry or transceiver parity allows symmetrical data rates, maintains collision avoidance properties, and improves connectivity.

A receiving unit according to the present invention comprises at least a receiver and an analog-to-digital converter. The receiver has an optical reception characteristic described by a reception angle $\phi_R$, also referred to as the receiver's half-angle $\phi_R$. Similarly, a transmitter has an optical emission characteristic described by an emission angle $\phi_R$, also referred to as the transmitter's half-angle $\phi_E$. A transceiver is characterized in that it comprises at least an optical emitter element and an optical receiver element, whereby a transmitter is not restricted to one single light emitting element and a receiver is not restricted to one single light receiving element. The optical transmitter is constructed such that its three-dimensional emission characteristic is identical or at least similar to the three-dimensional optical reception characteristic of the receiver. The use of optical parity or transceiver parity allows coexistence of devices with different optical ports supporting narrow- or wide angle as well as short range or longer range transmission. Details of the concept are addressed and claimed in the U.S. patent application with the Ser. No. 048 749 US, filed on 26 Mar. 1998 and entitled "Optoelectronic Transceiver", which is incorporated herein by means of reference.

In the following, embodiments of the invention are described.

FIG. 1 shows an apparatus 4 for receiving and/or transmitting an infrared signal in a wireless optical communication system or in a wireless optical network. A first transceiver 13, a second transceiver 23, and a third transceiver 33 are arranged in a staggered manner. The angle between the optical axis of adjacent transceivers 13, 23, 33 is about 120°, whereby the basic geometrical arrangement of the three transceivers 13, 23, 33 can achieve 360° of horizontal angular coverage at an optical interface of a mobile or fixed platform equipped for wireless optical networking. The fully integrated first transceiver 13 for a first channel comprises a first receiving unit 1 including a receiver which is here a photodiode revealing a Lambertian first reception characteristic 14 and reception circuitry. Further, a first transmitting unit 11 comprises at least one transmitter which here is a light emitting diode, called an emitter, a diffuser above the transmitter revealing a Lambertian first emission characteristic 15, and transmission circuitry. The diffuser is further described below.

It should be noted, that the emission characteristic 15, 25, 35 of the radiant intensity in units of mW/sr follows, or at least approximately, the cosine law, which is $\cos(\phi)^m$, m=1. The reception characteristic 14, 24, 34 of the optical receiver follows the same law.

The reception- and transmission circuitry is combined with a converter in a first transceiver chip 12, but nevertheless the first transceiver chip 12 can be separated in two or more single chips if that is advantageous. The components are mounted on a common lead frame and molded in a plastic package. The first transceiver chip 12 of the first transceiver 13 has a connection to a selector 5. The structure of the two other transceivers 23, 33 is equivalent. Therefore, the second transceiver 23 for a second channel comprises a second receiving unit 2, a second transmitting unit 21, and a second transceiver chip 22. The second transceiver chip 22 of the second transceiver 23 is connected to the selector 5. The third transceiver 33 for a third channel comprises a third receiving unit 3, a third transmitting unit 31, and a third transceiver chip 32. The third transceiver chip 32 of the third transceiver 33 is connected to the selector 5. Each transceiver 13, 23, 33 comprises a characteristic, whereby the first reception characteristic 14 and the first transmission characteristic 15, which are similar to each other, are schematically depicted in front of the first transceiver 13. A second reception characteristic 24 and a second transmission characteristic 25 are schematically depicted in front of the second transceiver 23. Further, a third reception characteristic 34 and a third transmission characteristic 35 are schematically depicted in front of the third transceiver 33. A first arrow in the direction of the first transceiver 13, labeled with S1, indicates a part of an arriving first infrared signal S1. For the sake of clarity, this first infrared signal S1 with an ideally infinite signal-to-noise ratio is depicted as S1 below the transceiver arrangement. A second arrow in the direction of the second transceiver 23, labeled with S2, indicates a part of an arriving second infrared signal S2, which arrives during the same time. The second infrared signal S2 with a signal-to-noise ratio of about 20 dB is also depicted below the transceiver arrangement of the apparatus 4. Furthermore, a third arrow in the direction of the third transceiver 33, labeled with S3, indicates a part of an arriving third infrared signal S3, which arrives also during the same time. The third infrared signal S3 with a signal-to-noise ratio of about 5 dB is also depicted below the transceiver arrangement.

The above mentioned diffuser is constructed in front of each transmitting unit 11, 21, 31 such that it provides a 60° half-power angle in all planes comprising the optical emission characteristics 15, 25, 35. The diffuser can be constructed, for example, from plastic material or other materials with embedded glass beads to achieve different indexes of refraction within the diffuser. Besides the advantages for improved connectivity, the diffuser offers additional advantages with respect to compliance with the eye safety norm IEC 825.1 because the apparent source size is determined by the diffuser size, rather than the transmitter chip size. The diffuser approach offers a simpler lead frame structure than alternative approaches where several conventional narrow-angle emitters are combined to achieve wide-angle emission. In cases where increased radiant intensity is required it is possible to mount several optical emitters underneath a common diffuser. Details of suited diffusers are given in the PCT international application with the International Publication Number WO 96/08090. This PCT application is presently assigned to the assignee of the instant application and incorporated herein by means of reference.

In FIG. 1, the first infrared signal S1 is being received by the first transceiver 13, the second infrared signal S2 is being received by the second transceiver 23 and the third infrared signal S3 is being received by the third transceiver 33. Each received signal S1, S2, S3 is converted to a digital signal, i.e. the first infrared signal S1 is converted to a first digital signal RxS_1, the second infrared signal S2 is converted to a second digital signal RxS_2, the third infrared signal S3 is converted to a third digital signal RxS_3. For the sake of clarity, the first digital signal RxS_1, the second digital signal RxS_2, and the third digital signal RxS_3 are depicted below the transceiver arrangement, respectively. In the following, the conversion is described as an example with the first infrared signal S1 on the first transceiver 13 but it is the same principle for the other two infrared signals S2 and S3 and its transceivers 23, 33, respectively. The conversion of the first infrared signal S1 takes place on the first transceiver chip 12. The first transceiver chip 12 is situated very close to the first receiver unit 1 in order to avoid long leads or wires which can be influenced by noise. First, the received first infrared signal S1 is guided to the first transceiver chip 12 and amplified by an amplifier before it is fed to a variable gain amplifier. The variable gain amplifier controlled by automatic gain control circuitry assures that the signal level at the following decision device is kept constant over the specified range of received optical signal power. The mentioned decision device is a binary decision-unit or a threshold value switch, also referred to as threshold decision device or comparator, which converts the first infrared signal S1 to the first digital signal RxS_1 by comparing the first infrared signal S1 to a threshold. This first digital signal RxS_1, as depicted below the apparatus 4, is fed to the selector 5. The same is performed with the second infrared signal S2 and the third infrared signal S3, respectively. The second infrared signal S2 is converted to the second digital signal RxS_2 and fed to the selector 5. The third infrared signal S3 is convened to the third digital signal RxS_3 and also fed to the selector 5. Thus, the three transceivers 13, 23, 33 are connected to the selector 5 providing functions for channel combining, selection and control. Depending on the control mechanism implemented in selector 5, a three-fold channel diversity can be exploited to obtain different modes of angle diversity for network connectivity. The selector 5 determines the best suited signal for further processing and passes on this best suited signal to further units via an output line xy. The method used to determine the best suited signal is described in detail with reference to FIG. 2 and FIG. 3. The apparatus 4 is able to receive and transmit data which is indicated by arrows in both directions on first, second and third signal lines to and from the selector 5, labeled with RxS_1, RxS_2, and RxS_3, respectively, which here indicates the received signals and labeled with TxS_1, TxS_2, and TxS_3, respectively, which here indicates the transmitted signals of transmit-data.

Figure 2:
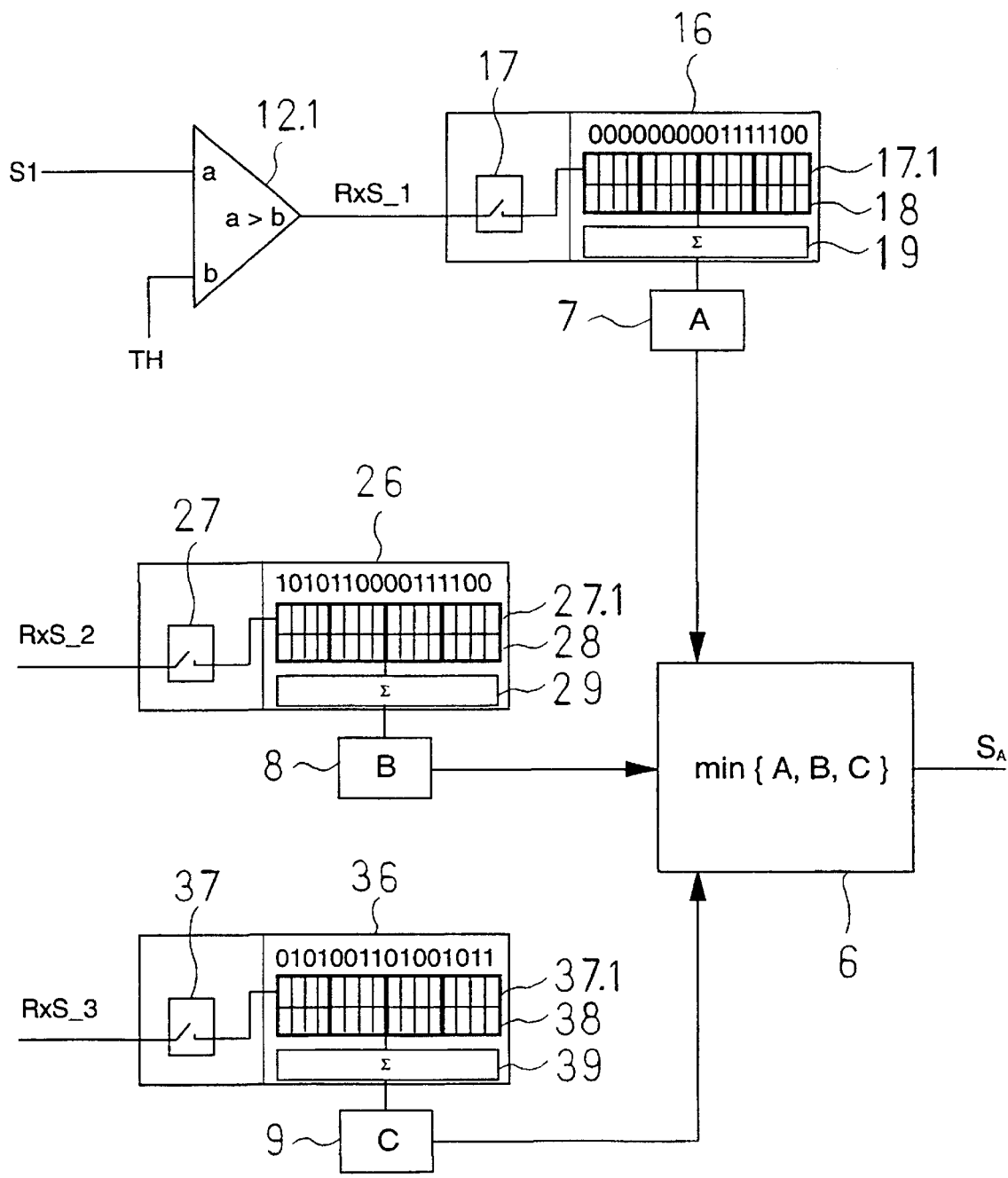
FIG. 2 shows a schematic illustration of a comparator and some sampling- and counting units.

FIG. 2 shows a schematic illustration of elements and units which together are able to determine the best suited signal from different signals for further processing. For a first channel a first binary decision-unit 12.1 is connected to a first sampling- and counting unit 16. This first sampling- and counting unit 16 includes a first sampler 17, a first serial shift register 17.1, a first array of independent sample-counters 18, hereinafter referred to as first sample-counters 18, and a first total-counter 19. The first sampler 17 is connected to the first serial shift register 17.1 which further is connected to the first sample-counters 18. The first sample-counters 18 are connected to the first total-counter 19. For a second channel a second sampling- and counting unit 26 is arranged. This second sampling- and counting unit 26 includes a second sampler 27, a second serial shift register 27.1, a second array of independent sample-counters 28, hereinafter referred to as second sample-counters 28, and a second total-counter 29. The second sampler 27 is connected to the second serial shift register 27.1 which further is connected to the second sample-counters 28. The second sample-counters 28 are connected to the second total-counter 29. For a third channel a third sampling- and counting unit 36 is arranged. This third sampling- and counting unit 36 includes a third sampler 37, a third serial shift register 37.1, a third array of independent sample-counters 38, hereinafter referred to as third sample-counters 38, and a third total-counter 39. The third sampler 37 is connected to the third serial shift register 37.1 which further is connected to the third sample-counters 38. The third sample-counters 38 are connected to the third total-counter 39. Further, the first sampling- and counting unit 16 is connected to a first number-memory 7, the second sampling- and counting unit 26 is connected to a second number-memory 8, and the third sampling- and counting unit 36 is connected to a third number-memory 9. All number-memories 7, 8, 9 are connected to a comparator 6, also referred to as selector or number-comparator 6. The number-memories 7, 8, 9 can also be included in the sampling- and counting units 16, 26, 36, respectively.

The first binary decision-unit 12.1 comprising a first input 'a' for the received first infrared signal S1 and a second input 'b' for a threshold 'TH'. This first binary decision-unit 12.1 is positioned on the described first transceiver chip 12, as mentioned with reference to FIG. 1. For the sake of simplification only one binary decision-unit is depicted in FIG. 2 whereas for each channel such a binary decision-unit is used. The first binary decision-unit 12.1 compares the first infrared signal S1 with the threshold 'TH' and puts out a first digital signal RxS_1 which is fed to the first sampler 17 of the first sampling- and counting unit 16. If the value of the first infrared signal S1 is larger than the value of the threshold 'TH', that means S1>TH, a logic level '1' is generated at the output of the first binary decision-unit 12.1, otherwise a logic level '0' is generated. A second digital signal RxS_2 coming from the second transceiver chip 22, shown in FIG. 1, and generated by a second binary decision-unit, is fed to the second sampler 27 of the second sampling- and counting unit 26. A third digital signal RxS_3 coming from the third transceiver chip 32, also shown in FIG. 1, and generated by a third binary decision-unit, is fed to the third sampler 37 of the third sampling- and counting unit 36.

The principle process used to determine a measure, a number, or a value in order to select the best suited signal is described with reference to the first sampling- and counting units 16 in more detail in connection with FIG. 3. The process is repeated until a measure or a value of a given or definite threshold is reached. However, the two sampling- and counting units 26 and 36 perform in the same way as the first counting unit 16 so that the following describes the process for the first sampling- and counting unit 16 only. The equivalent length of four slots or chips of a time interval of the preamble from the first digital signal RxS_1 are fed to the first sampling- and counting unit 16. The time interval represents a full 4-PPM symbol but does not need to start with a pulse, rather it starts anywhere. In order to accumulate in phase with previous time intervals in the sample-counters 18, the subsequent time intervals should be equivalent with respect to their time phase. The arriving first digital signal RxS_1 is oversampled in the first sampler 17 of the first sampling- and counting unit 16 and put as binary sequence in the first serial shift register 17.1, whereby here each chip is oversampled by four to obtain sixteen binary digits for a defined time interval. The binary digits are stored in single-bit registers or flag registers, where the binary digits arrive in the form of a sequential row. If sixteen binary digits from the defined time interval have arrived in the first serial shift register 17.1, then the first sample-counters 18 accumulate to their stored values the binary digits from the respective single-bit registers of the first serial shift register 17.1. This process is repeated for the following time intervals until the total-counter 19 calculates a first measure 'A' which is put in the first number-memory 7. The number of repetitions depends on statistics, the quality of the received signals, and the efficiency of recognition or analysis scheme. The second sampling- and counting unit 26 determines a second measure 'B' and puts this measure in the second number-memory 8. The third sampling- and counting unit 36 determines a third measure 'C' and puts this measure in the third number-memory 9. The number-memories 7, 8, 9 are connected to the number-comparator 6 or even implemented in the number-comparator 6. The number-comparator 6 compares the measures 'A', 'B', 'C' and determines the best suited signal for further processing. FIG. 2 indicates that the output of the number-comparator 6 selects the channel corresponding to measure 'A', this is indicated by labeling the output of the number-comparator 6 with $S_A$. Therefore, from three infrared signals S1, S2, S3, the first infrared signal S1 and thus the first digital signal RxS_1, also referred to as the one digital signal RxS_1, is the best suited signal for further processing.

The above scheme works since it is known and investigated that a relation exists between the signal-to-noise ratio and the error rate of a signal. For instance, investigations showed that the determined calculated measure, e.g. 'A', is directly related to the signal-to-noise ratio of the corresponding signal. This means, that the higher the determined calculated measure is, the lower the signal-to-noise ratio is. Thus it is sufficient to compare numbers or the measures A, B, C and find the smallest of the set {A, B, C} to determine the channel or path with the highest signal-to noise ratio.

Figure 3:
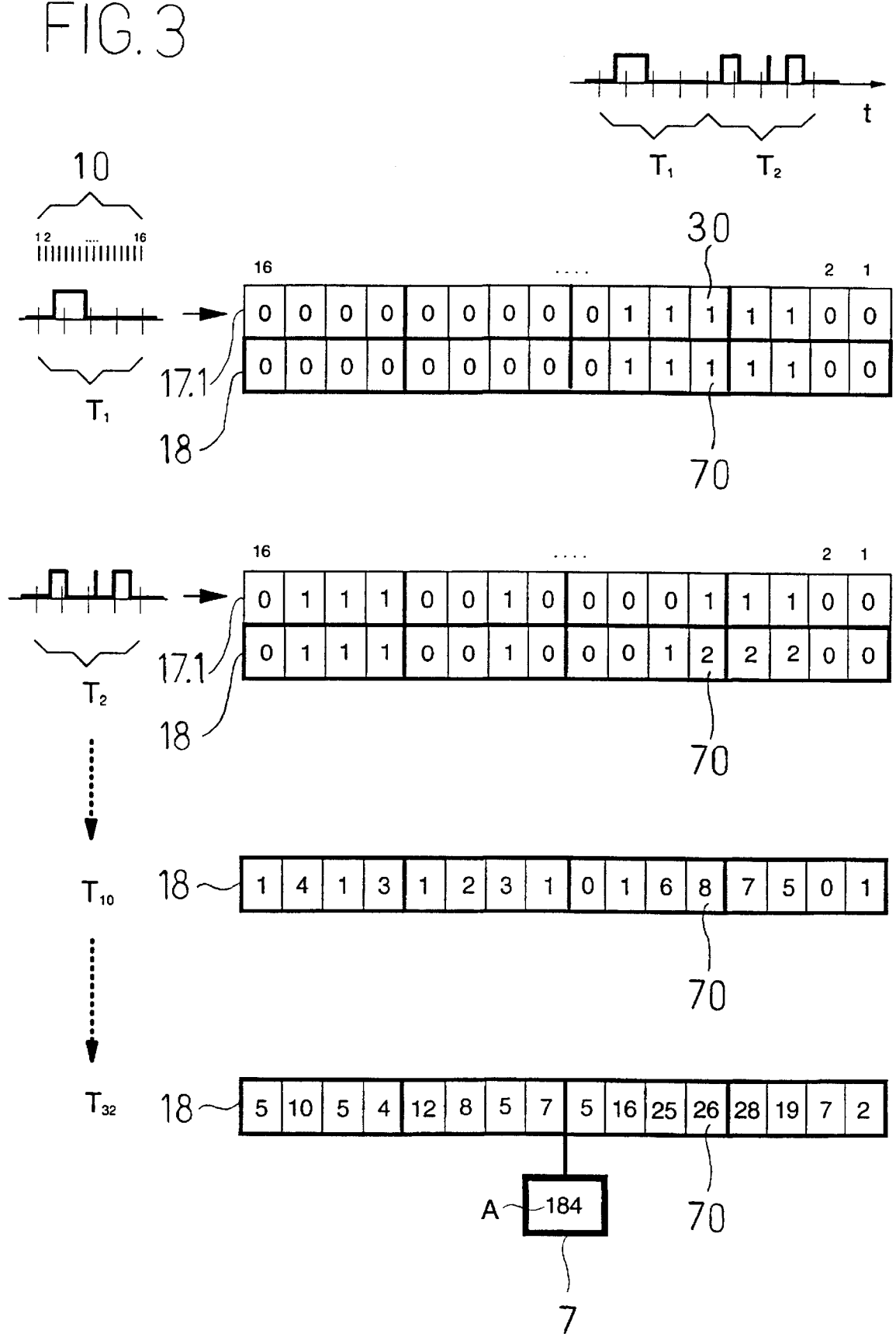
FIG. 3 shows some steps of an analysis of an oversampled bit sequence.

Turning now to FIG. 3 which shows some steps of an analysis of an oversampled binary signal at different times. These steps are performed through the sampling- and counting unit 16, shown in FIG. 2. More particularly, FIG. 3 shows the first serial shift register 17.1 and the attached first sample-counters 18 at a first time interval $T_1$ and a second time interval $T_2$, respectively, and further below only the sample-counters 18 at a tenth time interval $T_{10}$ and at a thirty-second time interval $T_{32}$, respectively. The first measure 'A' is calculated after the thirty-second time interval $T_{32}$ and stored in the number-memory 7. The first serial shift register 17.1 comprises sixteen single-bit registers which are indicated by single-bit register numbers 1, 2 . . . 16 above the first serial shift register 17.1. These single-bit register numbers and sixteen single-bit registers are related to a sample clock 10, shown above a sequence of the first time interval $T_1$.

For the sake of clarity, on the top are depicted two time intervals of a noisy digital signal of a preamble over a time axis t comprising four pulses, i.e. four logical 'one' or '1' having different pulse duration. Within the first time interval $T_1$ occurs only one pulse whereas in the following second time interval $T_2$ three pulses occur, whereby two pulses are error pulse caused by noise. The first time interval $T_1$ corresponds to the length of a legal 4-PPM symbol. As mentioned above, with the first time interval $T_1$ four chips of the preamble from the first digital signal RxS_1 are fed to the sampler 17, shown in FIG. 2.

The first time interval $T_1$ represents the length of a full symbol but generally such a time interval does not need to be aligned with a preamble symbol, rather in this example it starts with logical 'zero' instead of a pulse. The reason is that symbol synchronism and even chip synchronism has not to been established yet by the receiver. In fact, the scheme does not require such synchronism. At some time the four oversampled chips of the first time interval $T_1$, which physically are depicted beside the first serial shift register 17.1 and sample-counters 18, are stored in the first serial shift register 17.1, whereby each chip is oversampled by four to obtain sixteen binary digits. Where a pulse occurs, there results a '1' otherwise a '0'. The binary digits are stored in a simple register comprising single-bit registers or flag registers which can be set or not. Looking at the single-bit registers of the first serial shift register 17.1 shows that the single-bit registers from the third to the seventh single-bit register result in '1', whereby one single-bit register includes a binary digit 30. The individual binary digits from the single-bit registers of the first serial shift register 17.1 are accumulated to corresponding stored values in the first sample-counters 18. Here, the length of the array of sample-counters 18 is identical to the first serial shift register 17.1. For instance, a counter value 70, that indicates one stored value, in the first sample-counters 18 from the first pulse results in '1' in the first step. This counter value 70 and its stored value is observed further in detail. Refer now to the next time interval as depicted below. During the second time interval $T_2$ the chips are oversampled and the binary digits are put in the first serial shift register 17.1, respectively. By the way, the former single-bit registers are overwritten. The result is shown in the row of the first serial shift register 17.1 at the second time interval $T_2$. The first sample-counters 18 add the set single-bit registers or flags to the former counter values, respectively. After the addition, the counter values of the first sample-counters 18 are adapted, e.g. the observed counter value 70 has been increased by one and results in "2". Some time later, indicated by a dotted vertical line between the second time interval $T_2$ and the tenth time interval $T_{10}$, which means eight steps further at the tenth time interval $T_{10}$, a further sequence has been oversampled. The first sample-counters 18 show the result of the tenth step. The observed counter value 70 has been increased and results in "8". Finally, at the thirty-second time interval $T_{32}$, a still further sequence has been oversampled. The result is shown in the row of the first sample-counters 18. The observed counter value 70 has been increased and results in "26". The counter values of the first sample-counters 18 are calculated to a sum of digits to yield a measure 'A'; this is performed in a not depicted total-counter. This measure 'A' results in "184" and is stored in the first number-memory 7 for further processing as described with reference to FIG. 2.

A further embodiment includes a threshold, preferably at the last step before the measure 'A' is calculated, in order to set high numbers, that result from preamble pulses and not from noise, return to 'zero'. This is advantageous for better discrimination and determination of noise.

Figure 4:
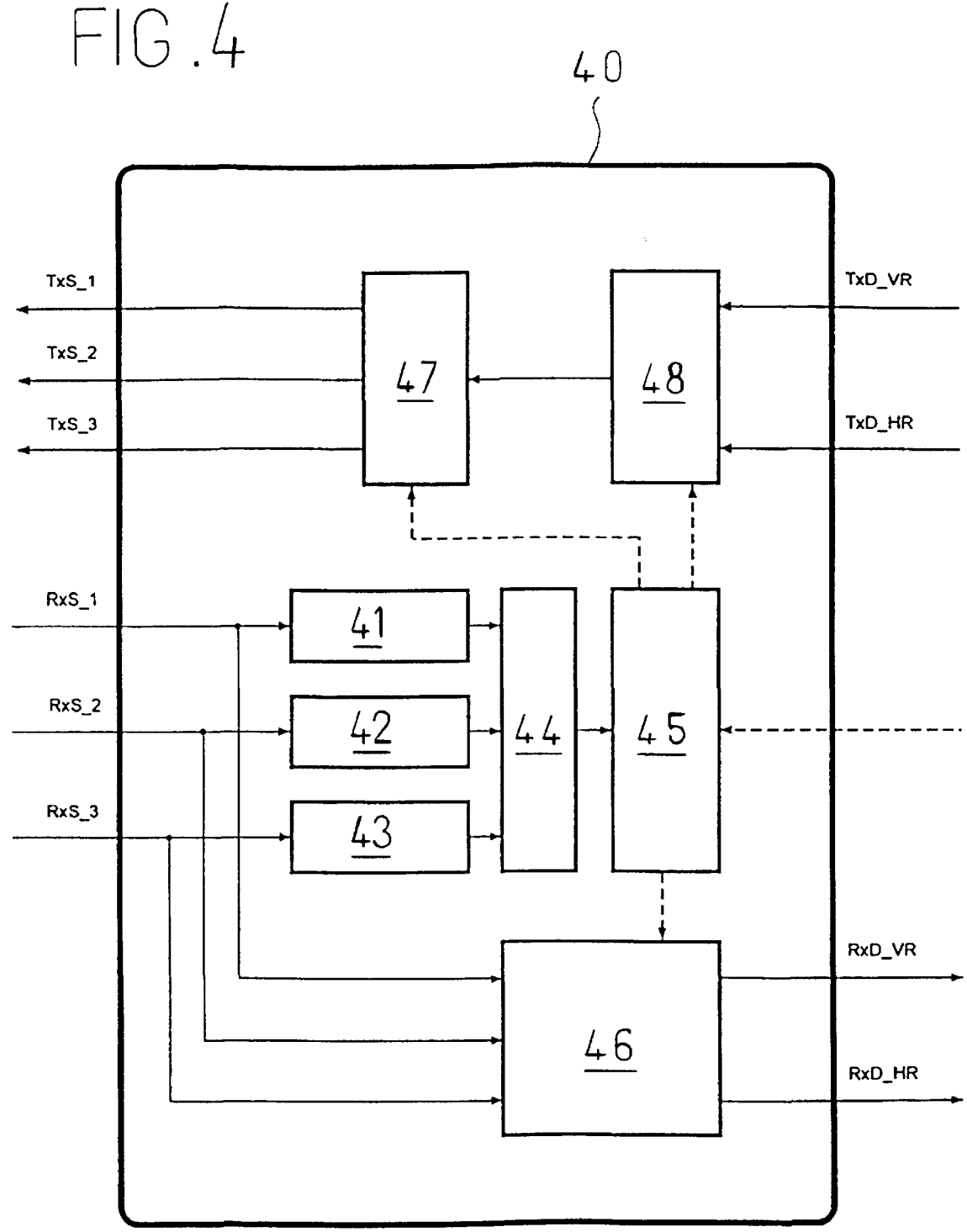
FIG. 4 shows a basic internal architecture of a selector.

FIG. 4 shows an embodiment of a basic internal architecture of a selector 40. The selector 40, also referred to as channel combiner, comprises a first channel-quality estimator unit 41 receiving RxS_1 signals, a second channel-quality estimator unit 42 receiving RxS_2 signals and a second channel-quality estimator unit 43 receiving RxS_3 signals. All channel-quality estimator units 41, 42, 43 are connected to an evaluation unit 44 whose output is guided to a control unit 45 and which is able to receive a control signal, indicated by the dotted line with an arrow to the control unit 45. The control unit 45 is connected on one side to a RxS combiner/selector unit 46. The RxS combiner/selector unit 46 is able to receive RxS_1, RxS_2, RxS_2 signals and to deliver a RxD_VR signal and a RxD_HR signal. Further, the control unit 45 is connected on the other side to a TxS enabler/driver unit 47 which delivers a TxS_1 signal, a TxS_2 signal and a TxS_2 signal. The control unit 45 is also connected to a TxD selector unit 48 which is connected to the TxS enabler/driver unit 47. The TxD selector unit 48 is able to receive data in form of a TXD_VR signal and a TxD_HR signal.

The selector 40 delivers signals, labeled TxS_1, TxS_2, and TxS_3, to transmitters by means of the TxS enabler/driver unit 47. For the sake of clarity, the transmitters are not depicted in FIG. 4 but the signals can be fed to the transceivers 13, 23, 33 shown in FIG. 1, respectively. The TxS enabler/driver unit 47 receives its input signal from the TxD selector unit 48 which selects the data to be transmitted from the TxD_VR signal and the TxD_HR signal. The TxS enabler/driver unit 47 and the TxD selector unit 48 are both controlled by the internal control unit 45. The received signals, labeled RxS_1, RxS_2, and RxS_3, are each processed in parallel by the channel-quality estimator units 41, 42, 43 respectively whose outputs are examined in the evaluation unit 44. With reference to FIG. 2 and FIG. 3, the described processes can be implemented in the channel-quality estimator units 41, 42, 43 and the evaluation unit 44. The latter unit delivers its output to the control unit 45. This control unit 45 also provides control for the RxS combiner/selector unit 46 which processes the RxS_1, RxS_2, RxS_2 signals and delivers the RxD_VR signals and the RxD_HR signals.

According to another embodiment, the received signals, labeled RxS_1, RxS_2 and RxS_3, are processed in sequence by a single channel-quality estimator unit whose output is examined in the evaluation unit 44.

According to still another embodiment, the RxS combiner/selector unit 46 delivers only the RxD_VR signal and the TxS enabler/driver unit 47 receives directly the TXD_VR signal. Then, no TxD selector unit 48 is required.

According to a further embodiment, the RxS combiner/selector unit 46 delivers only the RxD_HR signal and the TxS enabler/driver unit 47 receives directly the TXD_HR signal. In that case, no TxS selector unit 48 is required.

According to still a further embodiment, the selector 40 provides means for processing signals for only two transceivers, whereby then only two-fold channel diversity is achievable.

Figure 5:
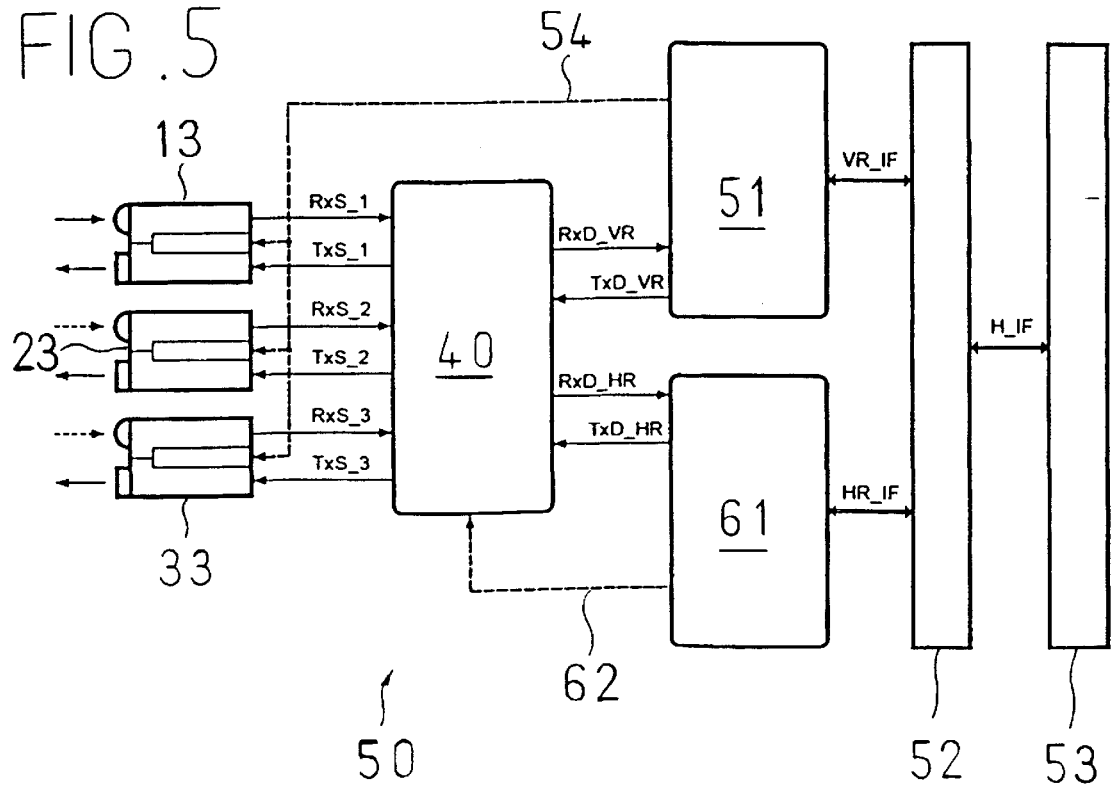
FIG. 5 shows a basic embodiment of an infrared communication system with three-fold channel diversity according to the present invention.

FIG. 5 shows a basic physical layer structure of an embodiment of an infrared communication system with three-fold channel diversity. Some elements and units are the same as used and described above and there referenced with the same numbering.

For the sake of simplification of the FIG. 5, the transceivers 12, 23, 33 are arranged in a row. However, to achieve three-fold channel diversity it is necessary to arrange the transceivers 12, 23, 33 in different or preferred directions. The transceivers 12, 23, 33 are able to receive and transmit infrared signal, which are indicated by arrows in front of the transceivers 12, 23, 33. The transceivers 12, 23, 33 are connected to the selector 40 that contains the functions that are necessary to provide the system with the desired angle diversity. The selector 40 is connected to a VR modem/controller 51 and a HR modem/controller 61. The VR modem/controller 51, also referred to as second modem unit 51 or Variable Rate modem/controller 51, has a connection to the transceivers 12, 23, 33 via a transceiver control line 54 and to a host interface 52. The HR modem/controller 61, also referred to as first modem unit 61 or High Rate modem/controller 61, is also connected to the host interface 52 and has, via a control line 62, a connection to the selector 40. The host interface 52 is connected to a host 53. The transmitted signals, labeled TxS_1, TxS_2 and TxS_3, carry the modulation signal for the transceivers 12, 23, 33. For example, the TxS_I, TxS_2 and TxS_3 signals are encoded to 4-slot Pulse Position Modulation (4-PPM), as described above. The received signals, labeled RxS_1, RxS_2 and RxS_3, carry the signals obtained from the respective receiver. As mentioned, in the preferred implementation these signals are binary-valued signals. The selector 40 receives data to be transmitted from either the VR modem/controller 51 or the HR modem/controller 61. The corresponding data lines are labeled TxD_VR and TxD_HR, respectively. Similarly, the selector 40 delivers received data to the VR modem/controller 51 or the HR modem/controller 61, whereby the corresponding data lines are labeled RxD_VR and RxD_HR, respectively. The VR modem/controller 51 and the HR modem/controller 61 are able to receive and transmit different data rates, e.g. the VR modem/controller 51 is able to work with data rates up to 4 Mbps and the HR modem/controller 61 supports data rates about 16 Mbps. However, the VR modem/controller 51 controls the operation mode of the transceivers 12, 23, 33 by issuing commands for setting decision threshold, bandwidth, transmitter power level, and others. The HR modem/controller 61 controls the operation mode of the selector 40 by issuing relevant commands. These commands include instructions for the receiver path on how to combine and/or select the RxS_1, RxS_2 and RxS_3 signals as well as for the transmit path on how to enable the TxS _1, TxS_2 and TxS_3 signals. The VR modem/controller 51 and HR modem/controller 61 are connected to the host interface 52 by means of a bus, labeled as bus signals VR_IF and HR_IF, respectively. The host interface 52 is connected to the host 53 through a bus line labeled. H_IF for communication with the protocol stack, e.g. medium access control, also abbreviated to MAC.

Figure 6:
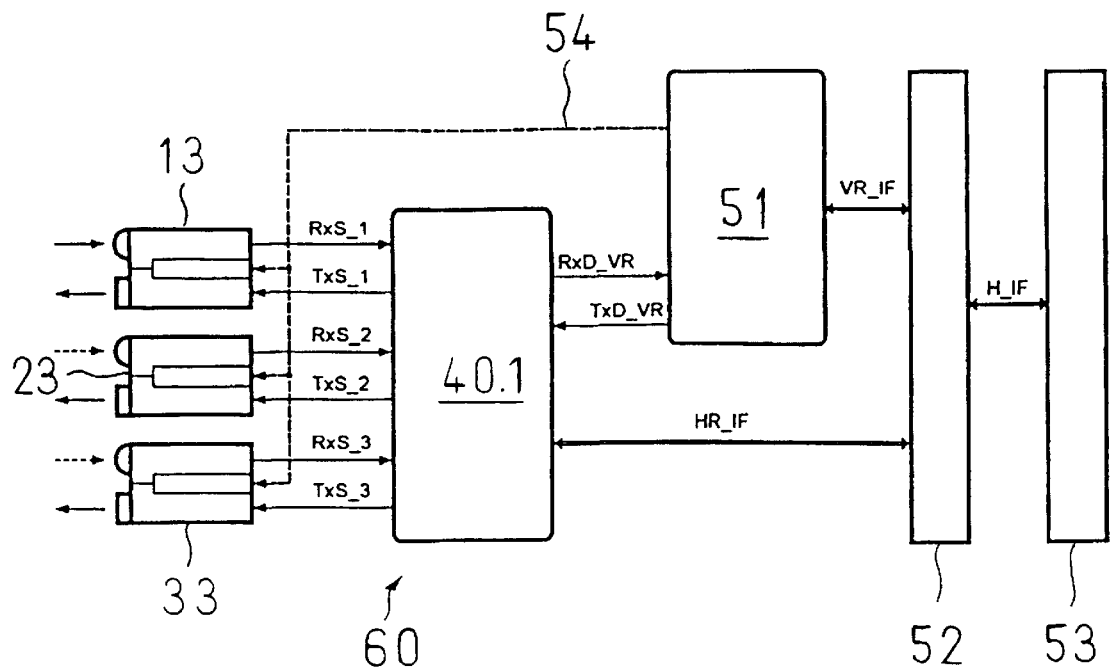
FIG. 6 shows a further basic embodiment of an infrared communication system with three-fold channel diversity.

FIG. 6 shows a further basic embodiment of an infrared communication system with three-fold channel diversity. All described elements and functions are the same, with the difference that the functions implemented in the HR modem/controller 61 and the selector 40 are combined in a single selector 40.1.

Regarding to FIG. 5 and FIG. 6, several combinations of elements and units are feasible. Some are addressed in the following.

According to another embodiment, the selector 40 is arranged as a single unit, the VR modem/controller 51 and the HR modem/controller 61 are combined in a further single unit.

According to another embodiment, the functions implemented in the selector 40, the VR modem/controller 51, and the HR modem/controller 61 are all combined in a single unit.

According to still another embodiment, the HR modem/controller 61 is not present and the selector 40 is controlled from the VR modem/controller 51.

According to a further embodiment, the HR modem/controller 61 is not present and the selector 40 and the VR modem/controller 51 are both combined in a single unit.

According to still a further embodiment, the VR modem/controller 51 is not present and the three transceivers 13, 23, 33 are controlled from the HR modem/controller 61.

According to yet another embodiment, VR modem/controller 51 is not present and the selector 40 and the HR modem/controller 61 are both combined in a single unit.

Any disclosed embodiment may be combined with one or several of the other embodiments shown and/or described. This is also possible for one or more features of the embodiments. The steps herein described and claimed do not need to be executed in the given order. The steps can be carried out, at least to a certain extent, in any other order.

What is claimed is:

1. Apparatus for receiving an infrared signal, comprising:
   at least two receiving units, each comprising a converter which converts the received infrared signal to a digital signal, whereby the digital signals represent data carried in frames comprising at least a data field and a header field which contains a preamble being identical for each of said digital signals, and
   a selector for determining for at least part of each of the preambles a measure related to its signal-to-noise ratio and comparing the measures in order to select for further processing the one digital signal with the highest signal-to-noise ratio, wherein the digital signal of the preamble is oversampled and weighted in order to determine the measure related to the signal-to-noise ratio.

2. Apparatus according to claim 1, wherein the preamble comprises a symbol forming a periodic sequence of pulses, preferably a sequence of pulses with a defined period.

3. Apparatus according to claim 2, whereby one symbol includes at least one pulse.

4. Apparatus according to claim 1, wherein the received infrared signal in each receiving unit is converted by a binary decision-unit to the digital signal.

5. Apparatus according to claim 1, wherein the selection of the one digital signal occurs during the reception of the preambles at the selector.

6. Apparatus according to claim 1, wherein each receiving unit is designed to provide an optical reception characteristic which is described by an obtuse reception angle $\phi_R$, wherein the reception angle $\phi_R$ is a planar angle that defines where the receiver's sensitivity is half the sensitivity of the sensitivity on the receiver's optical axis.

7. Apparatus according to claim 1, wherein the data are encoded by a pulse modulation, preferably a Pulse Position Modulation (PPM).

8. Apparatus according to claim 1, wherein at least the receiving unit which receives the preamble with a lower signal-to-noise than the one receiving unit which receives the one preamble with the highest signal-to-noise is switched off.

9. Apparatus for receiving and transmitting an infrared signal, which comprises:
   at least two receiving units, each comprising a converter which converts the received infrared signal to a digital signal, whereby the digital signals represent data carried in frames comprising at least a data field and a header field which contains a preamble being identical for each of said digital signals, and
   a selector for determining for at least part of each of the preambles a measure related to its signal-to-noise ratio and comparing the measures in order to select for further processing the one digital signal with the highest signal-to-noise ratio, wherein the digital signal of the preamble is oversampled and weighted in order to determine the measure related to the signal-to-noise ratio, and
   at least one transmitting unit, coupled to the selector.

10. Apparatus according to claim 9, wherein the receiving unit has an optical reception characteristic whose shape is identical or at least similar to the shape of an optical emission characteristic of the transmitting unit.

11. Apparatus according to claim 9, wherein at least one receiving unit and at least one transmitting unit and the converter are part of a transceiver.

12. Apparatus according to claim 11, wherein several transceivers are arranged to complement one another their optical reception characteristics and/or optical emission characteristics.

13. Apparatus according to claim 11, wherein at least three transceivers cover a range of 360°.

14. Apparatus according to claim 9, wherein the selector is connected to a unit comprising at least a first modem unit and/or a second modem unit.

15. Apparatus according to claim 9, wherein the selector is combinable with at least one modem unit, preferably with a High Rate modem/controller.

16. Apparatus according to claim 9, wherein at least the selector, a first modem unit, and a second modem unit are combinable to a single unit.

17. A method for receiving an infrared signal in a wireless optical communication system comprising the steps of:
   receiving the infrared signal by at least two receiving units,
   converting the infrared signal to a digital signal, whereby the digital signals represent data carried in frames comprising at least a data field and a header field which contains a preamble being identical for each of said digital signals,
   determining for at least part of each of the preambles a measure related to its signal-to-noise ratio and comparing the measures, wherein the digital signal of the preamble is oversampled and weighted in order to determine the measure related to the signal-to-noise ratio, and
   selecting the one digital signal with the highest signal-to-noise ratio for further data processing.

18. Method according to claim 17, wherein the measure is determined by:
   defining a time interval and splitting up the preamble in periodical time intervals,
   oversampling the preamble according to the time interval in order to provide a binary sequence comprising at least a binary digit,
   adding the individual binary digits of the binary sequence to corresponding stored values, and
   calculating the measure from the stored values.

19. Method according to claim 18, wherein the steps of oversampling and adding are repeated at least once.

20. Method according to claim 1, wherein the steps of oversampling and adding are repeated at least once.

21. A method for receiving an infrared signal and transmitting an infrared signal comprising the steps of:
   receiving the infrared signal by at least two receiving units,
   converting the infrared signal to a digital signal, whereby the digital signals represent data carried in frames comprising at least a data field and a header field which contains a preamble being identical for each of said digital signals,
   determining for at least part of each of the preambles a measure related to its signal-to-noise ratio and comparing the measures, wherein the digital signal of the preamble is oversampled and weighted in order to determine the measure related to the signal-to-noise ratio,
   selecting the one digital signal with the highest signal-to-noise ratio for further data processing, and
   transmitting transmit-data in the opposite direction where the one digital signal with the highest signal-to-noise ratio is being received or in all directions.

22. Method according to claim 21, wherein the measure is determined by:
   defining a time interval and splitting up the preamble in periodical time intervals,
   oversampling the preamble according to the time interval in order to provide a binary sequence comprising at least a binary digit,
   adding the individual binary digits of the binary sequence to corresponding stored values, and
   calculating the measure from the stored values.

* * * * *